(12) United States Patent
Bergamaschi et al.

(10) Patent No.: US 11,045,774 B2
(45) Date of Patent: Jun. 29, 2021

(54) CONTAINER FOR LIQUIDS ASSOCIATED WITH A CARBONATOR

(71) Applicant: EMDOTEM S.r.L., Milan (IT)

(72) Inventors: Mauro Bergamaschi, Corbetta (IT); Matteo Briccola, Milan (IT)

(73) Assignee: EMDOTEM S.r.L., Milan (IT)

( * ) Notice: Subject to any disclaimer, the term of this patent is extended or adjusted under 35 U.S.C. 154(b) by 193 days.

(21) Appl. No.: 16/229,081

(22) Filed: Dec. 21, 2018

(65) Prior Publication Data
US 2020/0197881 A1 Jun. 25, 2020

(51) Int. Cl.
| | | |
|---|---|---|
| B01F 3/04 | (2006.01) | |
| A23L 2/00 | (2006.01) | |
| A23L 2/54 | (2006.01) | |
| B01F 15/02 | (2006.01) | |
| B65D 81/32 | (2006.01) | |

(52) U.S. Cl.
CPC .......... B01F 3/04801 (2013.01); A23L 2/00 (2013.01); B01F 3/04106 (2013.01); B01F 3/04787 (2013.01); B01F 3/04794 (2013.01); B01F 15/0205 (2013.01); A23L 2/54 (2013.01); B65D 81/32 (2013.01)

(58) Field of Classification Search
CPC .... B01F 3/04; B01F 3/04106; B01F 3/04787; B01F 3/04794; B01F 3/04801; A23L 2/54
See application file for complete search history.

(56) References Cited

U.S. PATENT DOCUMENTS

| | | | | |
|---|---|---|---|---|
| 2,805,846 | A * | 9/1957 | Dewan | B01F 3/04801 261/121.1 |
| 4,457,877 | A * | 7/1984 | Love | B01F 3/04 261/64.3 |
| 9,205,387 | B2 * | 12/2015 | Bueno | A23L 2/56 |
| 9,227,827 | B1 | 1/2016 | Scott | |

FOREIGN PATENT DOCUMENTS

| | | |
|---|---|---|
| CA | 2609771 A1 | 12/2006 |
| EP | 1 454 843 A1 | 9/2004 |
| GB | 206 199 A | 10/1923 |
| WO | 2006/128653 A1 | 12/2006 |

OTHER PUBLICATIONS

The European Search Report for corresponding EP 17 17 8603, 2 pages, completed Oct. 25, 2017.
The Italian Search Report for corresponding IT 201600068705, 2 pages, completed May 2, 2017.

* cited by examiner

*Primary Examiner* — Robert A Hopkins
(74) *Attorney, Agent, or Firm* — Vorys, Sater, Seymour & Pease

(57) ABSTRACT

Provided is a container for liquids associated with a carbonator is provided including a base, a containment body, the container body and the base defining a first inner volume for a liquid, and an opening closable by a cap, configured to allow access to the liquid in the first inner volume, and wherein the base includes constraining means for a gas container having a second inner volume for the gas, a connection configured to place in fluidic connection the second inner volume with the first inner volume, a valve configured to obstruct or free the connection, and control means configured to control from outside the inner volume of the valve, and wherein the connection is separate from the opening.

9 Claims, 3 Drawing Sheets

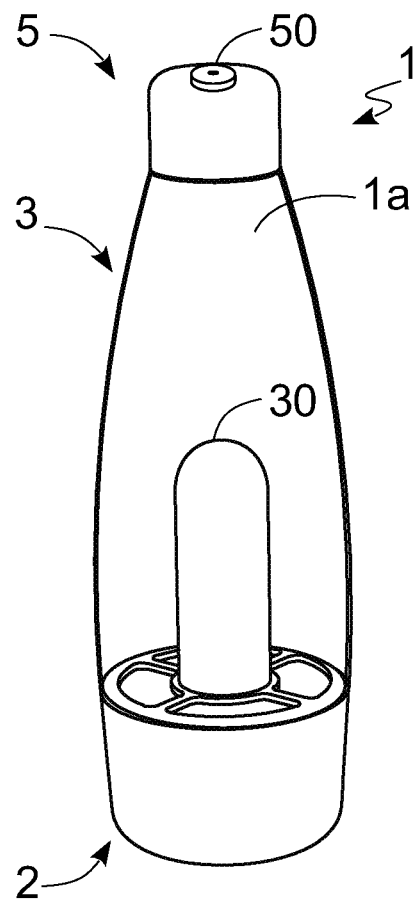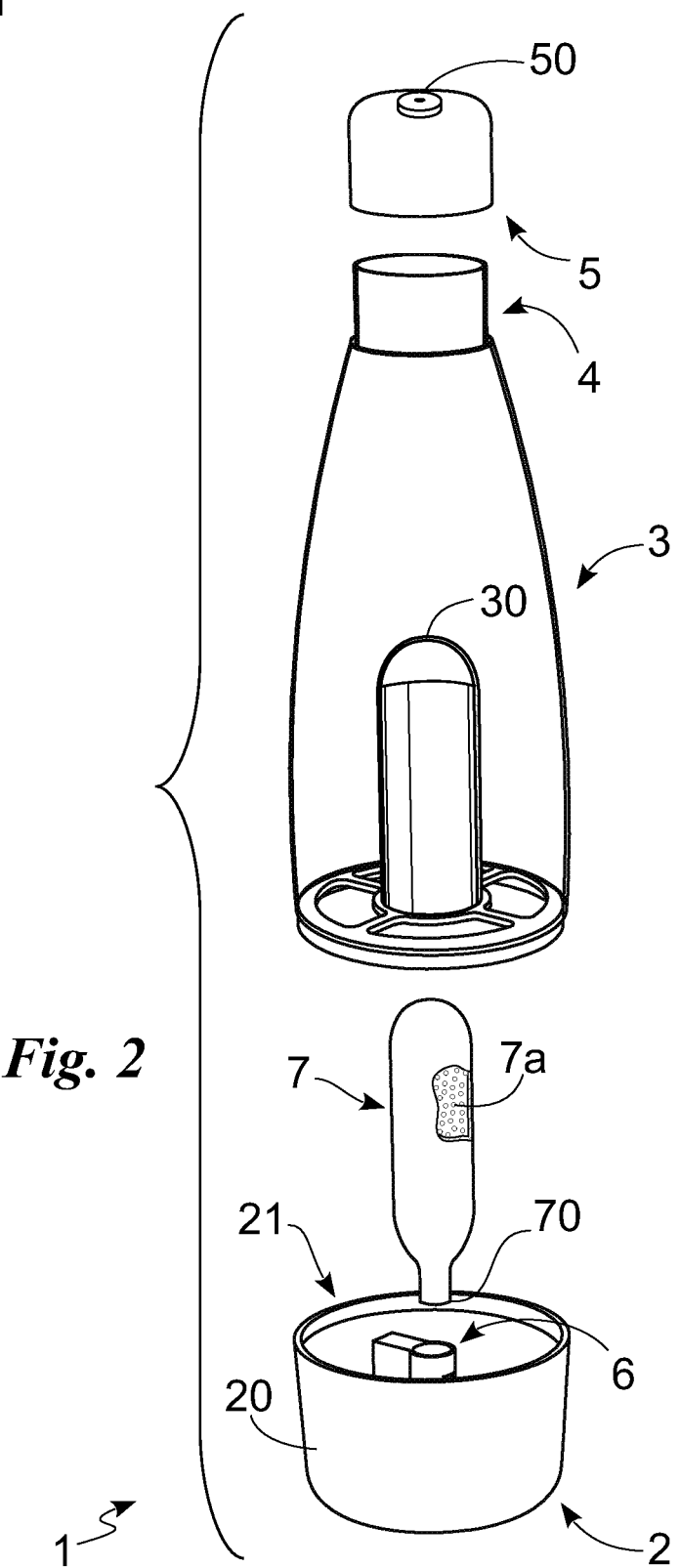
*Fig. 1*
*Fig. 2*

CONTAINER FOR LIQUIDS ASSOCIATED WITH A CARBONATOR

FIELD OF THE INVENTION

The present invention relates to a container for liquids associated with a carbonator comprising: a containment body; the containment body and the base defining a first inner volume for a liquid, an opening closable by a cap, suitable to allow access to the liquid in the first inner volume, and a base including: constraining means for a gas container having a second inner volume for the gas, a connection, different from the opening, suitable to place in connection for fluid passage the second inner volume with the first inner volume, a valve suitable to obstruct or free the connection, control means suitable to control from outside the inner volume, the valve, the constraining means being suitable to constrain the gas container inside the first inner volume.

In particular, the present invention relates to a device which can contain and possibly gasify liquids of different types such as water.

DESCRIPTION OF THE PRIOR ART

Various types of containers of liquids associated with a carbonator are known of in the prior art.

Among these are devices aimed substantially at domestic use and portable devices. The domestic devices are characterized by large structures suitable to accommodate bottles or bottle-shaped containers available and operatively connectable with an insufflation nozzle on the device.

This nozzle allows a gas, typically $CO_2$ to flow into the bottle under pressure from a pre-filled canister.

The portable devices are instead connected externally to the bottle generally, at the cap and are characterized by smaller dimensions than carbonators for domestic use, although not negligible.

An example of this type is for example described in the patent application US-A-2003/-9227827.

The prior art described has several significant drawbacks.

In particular, as already mentioned, the known devices have large dimensions, or, in the case of portable devices have in any case characteristics that make them awkward to move around.

In fact, all of the devices described have the drawback of being external to the bottle containing the liquid to be carbonated and, therefore, during use, require a dedicated space in which to house the same.

This drawback appears to be extremely relevant for use of the devices involving extra domestic activities such as hiking or otherwise.

Another important drawback is that all the devices require a set-up procedure for carrying out the activity which the device is for.

In fact, the bottles must be placed at the insufflation nozzle or portable devices must be fitted at the cap of the containers.

Following the carbonation procedure, it is therefore necessary to store or remove the carbonator to be able to use the liquid inside the bottles.

As a result, the devices of the prior art are unwieldy and do not allow an immediate use of the liquid manipulated.

The patent application GB-A-206199 describes a more portable device than the previous.

However, even this device has, in the first place, a device external to the bottle containing the liquid.

In addition, the constraining and connection means between the various components are complex and the gas placed inside the canister must go through at least two intermediate chambers before coming into contact with the liquid.

Moreover, once the gas inside the canister is finished it needs to be refilled with consequent disadvantages from the point of view of portability, as with the devices of the prior art previously mentioned.

Also the patent application EP-A-1454843 describes a device internal to the bottle containing the gas which can be opened only once.

In this situation, the technical purpose of the present invention is to devise a container for liquids associated with a carbonator able to substantially overcome the drawbacks mentioned above.

Within the sphere of said technical purpose one important aim of the invention is to provide a container for liquids associated with a carbonator which is portable and compact.

Another important object of the invention is to provide a container for liquids which makes it possible to manipulate a liquid in a simplified manner and therefore more rapid compared to the devices of the prior art.

SUMMARY OF THE INVENTION

The technical purpose and specified aims are achieved by container for liquids associated with a carbonator comprising: a containment body; the containment body and the base defining a first inner volume for a liquid, an opening closable by a cap, suitable to allow access to the liquid in the first inner volume, and a base including: constraining means for a gas container having a second inner volume for the gas, a connection, different from the opening, suitable to place in connection for fluid passage the second inner volume with the first inner volume, a valve suitable to obstruct or free the connection, control means suitable to control from outside the inner volume, the valve, the constraining means being suitable to constrain the gas container inside the first inner volume, the base and the containment body defining an operating configuration in which the base and the containment body are mutually coupled and a non-operating configuration in which the base and the containment body are mutually disengaged, in the non-operating configuration the gas container is accessible and a user can constrain or release the gas container to the constraining means.

BRIEF DESCRIPTION OF THE DRAWINGS

The characteristics and advantages of the invention are clearly evident from the following detailed description of preferred embodiments thereof, with reference to the accompanying drawings, in which:

FIG. 1 shows the container for liquids;

FIG. 2 shows an exploded view of the container for liquids;

DESCRIPTION OF THE PREFERRED EMBODIMENTS

Figure 3:
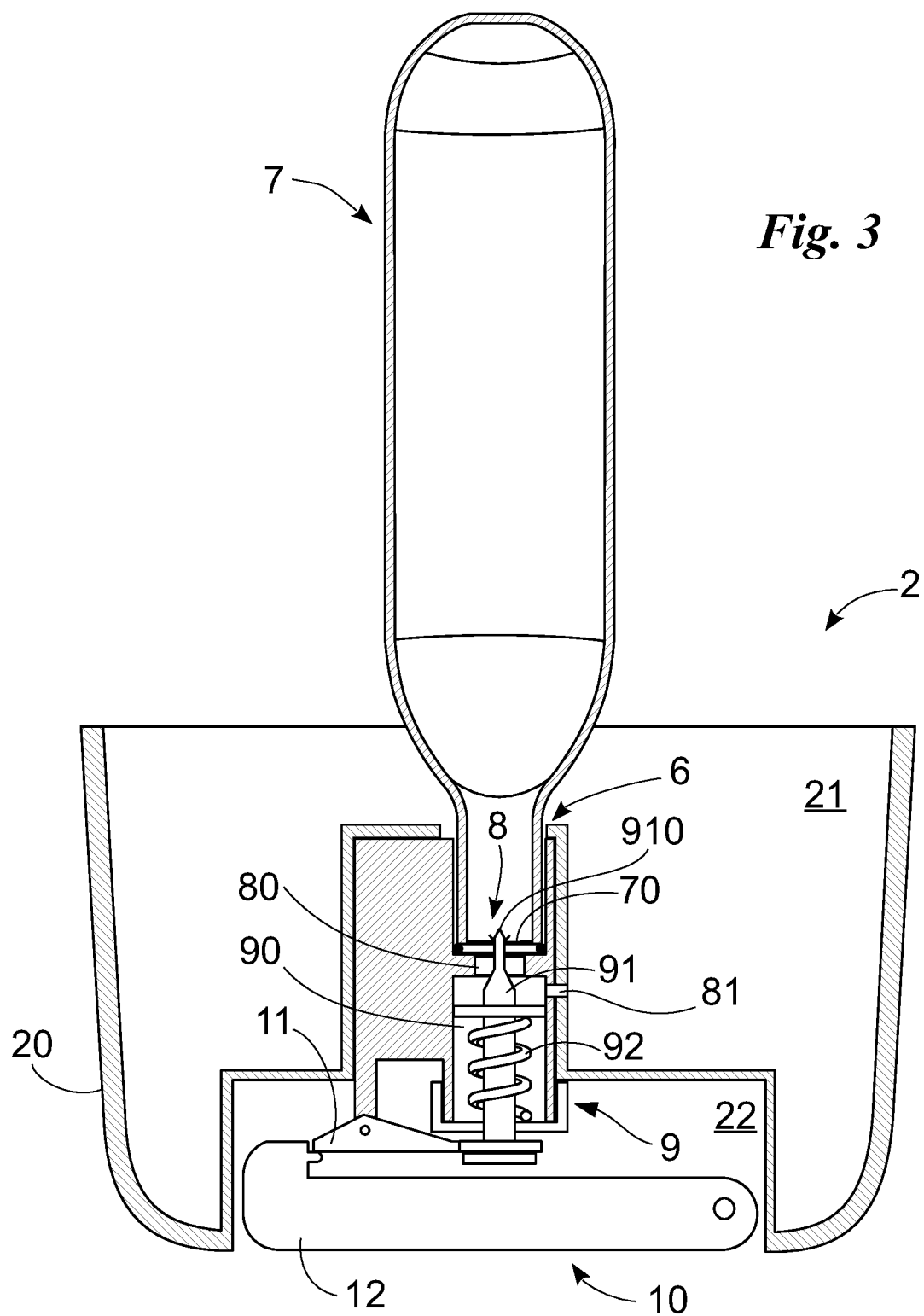
FIG. 3 is a cross-section of the base of the container for liquids.

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference which it is associated with. For example, said terms, if associated with a value, preferably indicate a divergence of not more than 10% of said value.

In addition, where used terms such as "first", "second", "upper", "lower", "main" and "secondary" do not necessarily refer to an order, a priority relationship or relative position, but may simply be used to more clearly distinguish different components from each other.

With reference to the Drawings, reference numeral 1 globally denotes the container for liquids associated with a carbonator.

The container for liquids 1 comprises a base 2, a containment body 3 and an opening 4.

In particular, the base 2 and the containment body 3 define, for example, a first inner volume 1a.

Consequently, the first inner volume 1a preferably substantially assumes the shapes and size defined by the base 2 and the containment body 3.

The base 2, for example, defines a main axis 2a.

The base 2 preferably comprises a concave surface 20 inside which a cavity 21 is made.

The cavity 21 is therefore, for example, a portion of the first inner volume 1a and in particular the portion of the first inner volume 1a enclosed by the base 2.

The concave surface 20 may be any shape and size and is preferably a cylinder centred on the main axis 2a open at one of the two bases and comprising a compartment 22 at the opposite base.

The compartment 22 is for example a substantially cylindrical shape centred along the main axis 2a protruding toward the inside of the base 2.

Consequently, the cavity 21 may also be any shape and size depending on the characteristics of the surrounding surface and therefore substantially in a manner complementary to the inner shape of the concave surface 20 and the compartment 22.

The base 2 further comprises means of introducing a substance inside the base 2. In particular the substance may be a gas. The gas is preferably carbon dioxide ($CO_2$).

The base 2 preferably comprises constraining means 6, a connection 8, a valve 9 and control means 10.

The above-mentioned constraining means 6, connection means 8, valve 9 and control means 10 are preferably arranged inside the cavity 21.

The constraining means 6 are preferably suitable to constrain the base 2 to a gas container 7.

The gas container 7 may be any shape or size and preferably is made of a similar structure to the compressed-gas cartridges used in canisters for soda.

The gas container 7 thus defines a second inner volume 7a.

The second inner volume 7a is preferably delimited by the walls of the gas container 7 and is also, for example, suitable to house a substance to be introduced inside the first inner volume 1a and therefore comprises a gas.

The gas may be any gas preferably used to add to liquid such as common beverages and therefore is for example carbon dioxide.

It is also hermetically sealed at its opening by an occluder 70.

The occluder 70 is for example a rubber stopper of the type commonly used for example for injection drugs and is suitable to be perforated to be able to access the second inner volume 7a defined by the gas container 7. Alternatively, the occluder 70 is a very thin metal wall similar to that used in the compressed-gas cartridges used in canisters for soda.

The gas container 7 can be coupled, as mentioned, to the base 2 via the constraining means 6 and may therefore have interlocking tabs or threads or otherwise.

Preferably the constraining means 6 consist of a hollow cylinder centred on the main axis 2a comprising smooth walls.

As a result of what has been said the gas container 7 comprises, for example a neck adjacent to the occluder 70 provided inside the cylinder defined by the constraining means 6 and having a suitable geometry to be coupled to the constraining means 6.

In an alternative configuration, the constraining means 6 consist of a hollow cylinder centred on the main axis 2a comprising threaded corresponding parts on the inside thereof.

In addition, the gas container 7 comprises, for example a neck adjacent to the occluder 70 provided inside the cylinder defined by the constraining means 6 and having threaded corresponding parts suitable to be coupled to the corresponding parts of the constraining means 6.

These configurations allow, for example, the gas container 7 to be replaceable.

In fact, the gas container 7 is preferably attachable and removable for easy replacement in case of complete emptying of the gas contained inside it.

In particular, the constraining means 6 therefore have a hole, for example coinciding with a base of the cylinder, with dimensions compatible with the neck of the gas container 7 and suitable to introduce at least part of the gas container 7 therein, and a connection 8.

The connection 8 is for example placed on the constraining means 6 on the base opposite the inlet base of the gas container 7.

Preferably the connection 8 is for example a hole or a duct suitable to operatively connect the first inner volume 1a and the second inner volume 7a.

In particular, for example, the connection 8 operatively connects the gas container 7 and the cavity 21 and preferably the connection 8 is a duct comprising an inlet hole 80 and an outlet hole 81.

The inlet hole 80 is, for example, directly connected with the constraining means 6 and therefore with the gas container 7 while the outlet hole 81 is connected directly with the cavity 21 and therefore with the first inner volume 1a.

The connection 8 is also preferably operatively connected with a valve 9.

The valve 9 may comprise various apparatuses such as a solenoid valve or a tap or otherwise.

Preferably the valve 9 comprises a control chamber 90, a plunger 91 and an elastic element 92.

The control chamber 90 may be any shape or size as long as suitable to house the internal control elements and in particular the plunger 91.

The control chamber 90 is also operatively connected to the connection 8 and in particular is arranged between the inlet hole 80 and the outlet hole 81.

The inlet hole 80 preferably, as said, faces the entrance of the gas container 7 and thus the occluder 70 allowing the control chamber 90 to communicate with it.

The gas container 7 is in fact preferably partially placed inside a space, such as the aforementioned cylinder, defining the constraining means 6.

The outlet hole 81 is preferably suitable to operatively connect the control chamber 90 and the cavity 21.

As a result, the control chamber 90, for example, substantially comprises an interference member placed on the connection 8, and therefore between the first inner volume 1a and the second inner volume 7a.

The plunger 91 may be any shape or size and preferably is suitable to close and open the inlet hole 80.

In other words, the plunger 91 preferably has the function of obstructing or freeing the connection 8 and in particular allowing or preventing the passage of gas comprised in the gas container 7 between the inlet hole 80 and the outlet hole 81.

Consequently, the plunger 91 comprises at least one geometrically complementary portion to the inlet hole 80 and is suitable to entirely occupy, for example hermetically, the same.

The control chamber 90 and the plunger 91 are thus structured in such a way to realize, when open, a passage or direct duct between the inlet hole 80 and the outlet hole 81.

Therefore, in this configuration, the second inner volume 7a and the first inner volume 1a are in direct connection for fluid passage.

The term direct connection for fluid passage means that there are no chambers rooms or collection tanks between the two volumes 1a, 7a.

At the geometrically complementary portion to the inlet hole 80 of the plunger 91 a pin 910 is also preferably placed.

The pin 910 is for example suitable to pierce the opening of the gas container 7, and thus preferably the occluder 70 in such a way as to enable the gas, contained inside the gas container 7, to flow outwardly.

The control chamber 90 and the plunger 91 preferably comprise a structure substantially similar to an actuator of the jack type.

The plunger 91 is also operatively connected to an elastic element 92.

The elastic element 92 is for example a spring and is suitable to keep the plunger 91 in its closed configuration, i.e. in such a way as to occupy entirely the inlet hole 80.

At least a portion of the plunger 91 is preferably external to the control chamber 90. The aforesaid portion is thus, for example, operatively connected to the control means 10.

The control means 10 may for example comprise a control knob, or even a pushbutton or other element which ensures the controlled movement of the plunger 91.

In particular, preferably the control means 10 comprise a first component 11 and a second component 12.

The first component 11 is for example a lever hinged on the base 2 preferably halfway along its extension, and movably engaged at one end to the outer section of the plunger 91.

The portion of the first component 11 opposite the plunger 91 is preferably movably engaged with the second 12 component.

Therefore, the first component 11 is for example similar to a first-class lever.

The second component 12 is more preferably a lever movably engaged to the first component 11 at one end.

The second component 12 is for example pivoted on the base 2 at the opposite end with respect to the connection with the first component 11 and therefore is for example similar to a third-class lever.

The second component 12 and the first component 11 preferably allow the movement of the plunger 91 in such a manner as to open or close the inlet hole 80. Said inlet hole 80, as mentioned, allows for example the control chamber 90 to communicate with the second inner volume 7a while the outlet hole 81 allows the control chamber 90 to communicate with the first inner volume 1a.

Therefore, the opening and closing of the inlet hole 80 preferably involve the opening and closing of the connection 8, and thus the obstruction or the freeing of the passage of gas from the second inner volume 7a to the first inner volume 1a. The base 2, just described, is also preferably constrained to the container body 3, for example by means of threading or interlocking.

In particular, the base 2 may be arranged depending on different configurations and is therefore, for example, below the containment group, or above, or even lateral or internal thereto.

The containment body 3, for example, is arranged at the cavity 21 of the base 2.

The body 3 is preferably substantially a bottle body hermetically attachable to the base 2 so as to trap a volume comprised inside the base 2 and the body 3.

This volume is therefore constituted for example by the first inner volume 1a.

More in detail, the base 2 and said containment body 3 define an operating configuration in which the base 2 and the containment body 3 are mutually constrained.

Furthermore, they define a non-operating configuration in which the base 2 and the containment body 3 are mutually disengaged.

In the non-operating configuration, the gas container 7 is made accessible.

As a result, a user can, for example, easily access the gas container 7.

In fact, the non-operating configuration is preferably suitable to allow the constraint or removal of the gas container 7 to the constraining means 6.

This way the gas container 7, as already mentioned above, may easily be replaced. The body 3 may therefore be provided above the cavity 21 and coupled by interlocking above the base 2.

Moreover, the body 3 may be empty, or may have inside it corresponding parts suitable to house the gas container 7 therein or even grates, or perforated surfaces, separating its inner volume and the cavity 21.

Preferably, the gas container 7 is inside the device for liquids and therefore the body 3 comprises a corresponding part substantially complementary to the gas container 7 and suitable to constitute a containment casing 30.

In particular, the containment casing 30 is for example suitable to allow the separation between the liquid contained in the container for liquids 1 and the outer surface 7 of the gas container.

In addition, the containment casing is preferably suitable to keep the gas container 7 in position, i.e. as arranged for example at the constraining means 6.

As a result, the containment casing is for example suitable to form with the constraining means 6 an airtight casing.

The body 3 is also operatively connected to the opening 4.

Such opening 4 is therefore, for example, a narrowing at the opposite end to the base 2.

Such narrowing is for example a bottleneck of the type commonly known in the art and used for pouring the liquid or directly for drinking.

Preferably, the body 3 has at the aforementioned narrowing fastening elements suitable to connect with a cap 5.

As a result, for example, the fastening elements may be threads of the type commonly known in the art.

The cap 5 may be of the common type and is for example suitable to hermetically close the liquid container 1, and thus allow the entrapment, inside the volume described by the base 2 and the containment body 3, of a quantity of liquid, for example 75 cl.

The liquid is for example water.

Therefore, the container for liquids, for example, is suitable to contain water and is preferably suitable to generate carbonated water.

Finally, the cap 5 may comprise for example a safety element 50 suitable to reduce the pressure inside the first inner volume 1a.

Such safety element 50 is preferably a valve of the common vent type and therefore suitable to allow venting of excess gas inside the first inner volume 1a of the container for liquids 1.

The aforementioned vent valve may also be, for example, alternatively arranged on the containment body 3 or even on the base 2.

The functioning of the container for liquids 1 associated with a carbonator, described above in structural terms, is as follows.

Figure 4:
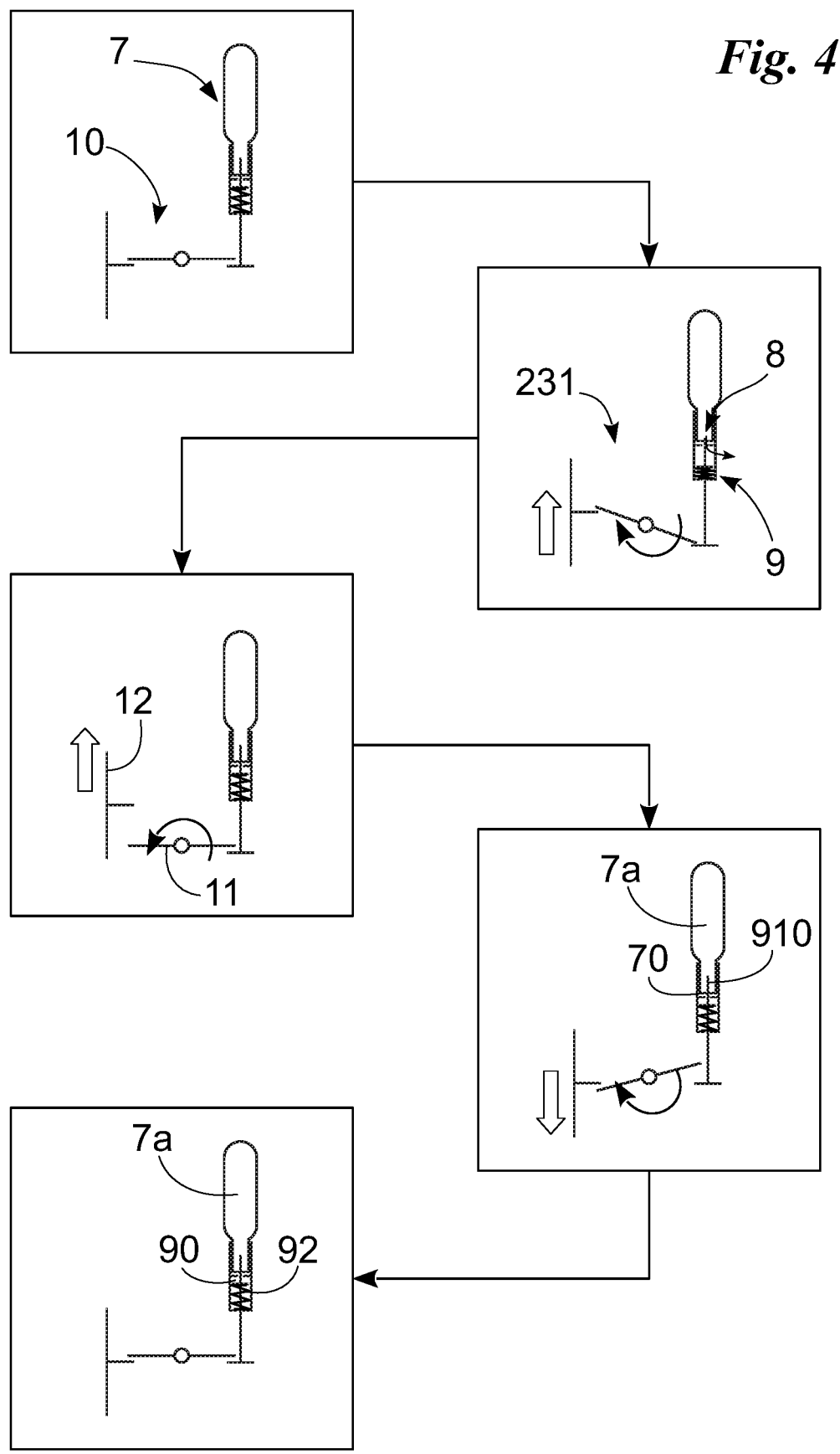
FIG. 4 is a diagram showing the functioning of the container for liquids.

The second component 12, once pressed, allows the removal of the plunger 91 from the inlet hole 80 by means of a lever mechanism (FIG. 4).

In particular, the movement of the second component rotates the first component 11 around its own hinge.

The first component 11 thus pulls the plunger 91 away from the inlet hole 80 overcoming the force of elastic resistance of the elastic element 92.

Upon removal of the plunger 91 from the hole 80 the gas inside the gas container 7 is released flowing from the second inner volume 7a to the first inner volume 1a through the connection 8.

In particular the gas passes the inlet hole 80, crossing part of the command chamber 90 and escaping through the outlet hole 81.

In more detail, the gas is released from the canister through a hole made at the occluder 70 by the pin 910.

Once outside the outlet hole the gas enters the cavity 21 and thus the first inner volume 1a, inside which the liquid inside the container for liquids 1 is partially placed. The gas is then mixed with the liquid and therefore the liquid is manipulated from the original state to the state of liquid with addition of gas.

Beyond a given rotation (definable depending on the constructive configuration) the second component 12 is released from the first component 11 and therefore the elastic element 92, comprised inside the control chamber 90, allows the released plunger 91 to return to its closed configuration avoiding the involuntary dispersion of gas.

As a result of the above, the container for liquids 1 allows gas to enter inside the cavity 21 both in an impulsive manner by means of the mechanisms of the control mean 10 and in a continuous manner by pressing slightly the second component 12.

Lastly, once the gas in the gas container 7 is exhausted, it is possible to refill said container 7 or replace it entirely with another.

The container for liquids 1 associated with a carbonator according to the invention achieves important advantages.

In fact, the container for liquids 1 incorporates within it the base 2 comprising the adjustment means of a gas to be introduced on command in a liquid and therefore turns out to be very compact ensuring portability and greater convenience compared to the available devices of the prior art.

In addition, the shape of the container for liquids 1 allows it to perform the required functions of the device in any situation.

It makes it possible for example even for users engaged in sports activities to take advantage of its features.

In conclusion, the operation of the device is simplified and quick.

As a result, the container for liquids 1 is extremely competitive both from an economic point of view, when compared to the much more complex household devices, and from a utilisation point of view.

Variations may be made to the invention without departing from the scope of the inventive concept defined in the claims.

For example, the shapes and the dimensions of the container for liquids 1 may be different depending on the purposes for which the device is provided.

In said sphere all the details may be replaced with equivalent elements and the materials, shapes and dimensions may be as desired.

The invention claimed is:

1. A container for liquids and a carbonator comprising:
a containment body;
a base;
said containment body and said base defining a first inner volume for a liquid,
an opening closable by a cap, configured to allow access to said liquid in said first inner volume, and
said base comprising:
constraining means for a gas container having a second inner volume for said gas,
a connection, different from said opening, configured to place in connection for fluid passage said second inner volume with said first inner volume,
a valve configured to obstruct or free said connection,
control means configured to control from outside said inner volume, said valve,
said constraining means being configured to constrain said gas container inside said first inner volume and
said base and said containment body defining an operating configuration in which said base and said containment body are mutually coupled and a non-operating configuration in which said base and said containment body are mutually disengaged, in the said non-operating configuration said gas container is accessible and a user can constrain or release said gas container to said constraining means.

2. The container according to claim 1, wherein said second inner volume and said first inner volume are in direct connection for fluid passage.

3. The container according to claim 1, wherein said valve comprises a control chamber, a plunger and an elastic element.

4. The container according to claim 1, wherein said connection comprises an inlet hole and an outlet hole and wherein said control chamber is positioned between said inlet hole and said outlet hole and said plunger is configured to open or obstruct said inlet hole.

5. The container according to claim 1, wherein said plunger comprises a pin and said gas container comprises an occluder, said occluder being arranged at said inlet hole and said pin being adapted to pierce said occluder.

6. The container according to claim 1, wherein said control means comprises a first component and a second component and wherein said plunger is movably engaged to said first component, said first component being movably engaged to said second component, said second component configured to move said plunger by means of said first component from outside said first inner volume.

7. The container according to claim 1, in which said cap comprises a safety element, said safety element being an air vent valve.

8. The container according to claim 1, wherein said plunger is maintained in the configuration occluding said inlet hole by said elastic element.

9. The container according to claim 1, wherein said containment body comprises a containment casing configured to include and keep in position said gas container and suitable to define with said constraining means a hermetically sealed casing.

\* \* \* \* \*